United States Patent [19]
Griffen et al.

[11] Patent Number: 5,514,955
[45] Date of Patent: May 7, 1996

[54] SLIM PROFILE DIGITAL TACHOMETER INCLUDING PLANAR BLOCK AND ROTOR HAVING SPOKES AND CLAMP

[75] Inventors: Neil Griffen, Westerville; Mark Ayzenberg, Columbus; Kenneth Dickinson, Worthington, all of Ohio

[73] Assignee: Lake Shore Cryotronics, Inc., Westerville, Ohio

[21] Appl. No.: 223,512

[22] Filed: Mar. 11, 1994

[51] Int. Cl.⁶ .......................... G01R 33/038; G01P 3/54; B65D 73/02
[52] U.S. Cl. ............................................ 324/262; 324/174
[58] Field of Search .............................. 324/262, 207.25, 324/207.21, 252, 251, 207.2, 160, 163, 166, 173, 174, 175, 167, 177; 310/68 B, 48, 66; 340/671; 206/328, 334

[56] References Cited

U.S. PATENT DOCUMENTS

| | | |
|---|---|---|
| 3,636,364 | 1/1972 | Stempler et al. ........................ 324/161 |
| 3,649,871 | 3/1972 | Klein et al. . |
| 3,654,480 | 4/1972 | Stephenson . |
| 3,764,888 | 10/1973 | Anderson . |
| 3,997,782 | 12/1976 | Willits . |
| 4,110,676 | 8/1978 | Edick et al. . |
| 4,157,482 | 6/1979 | Kakinuma ............................... 324/174 |
| 4,199,719 | 4/1980 | Grob . |
| 4,262,251 | 4/1981 | Fujishiro et al. . |
| 4,274,053 | 6/1981 | Ito et al. . |
| 4,319,188 | 3/1982 | Ito et al. . |
| 4,350,952 | 9/1982 | Holt et al. . |
| 4,383,303 | 5/1983 | Hoffman . |
| 4,418,372 | 11/1983 | Hayashida et al. . |
| 4,506,217 | 3/1985 | Rothley et al. . |
| 4,617,484 | 10/1986 | Buijsen ..................................... 310/51 |
| 4,639,807 | 1/1987 | Sekizawa et al. . |
| 4,642,496 | 2/1987 | Kerviel et al. . |
| 4,656,377 | 4/1987 | Akiyama et al. . |
| 4,668,913 | 5/1987 | Vinal . |
| 4,686,472 | 8/1987 | Van Ooijen et al. . |
| 4,703,262 | 10/1987 | Fujioka et al. .......................... 324/174 |
| 4,712,064 | 12/1987 | Eckardt et al. . |
| 4,742,297 | 5/1988 | Heaton et al. . |
| 4,766,376 | 8/1988 | Takahashi et al. . |
| 4,786,870 | 11/1988 | Kawamata et al. . |
| 4,800,457 | 1/1989 | Kryder et al. . |
| 4,810,953 | 3/1989 | Huynh . |
| 4,816,948 | 3/1989 | Kamo et al. . |
| 4,818,939 | 4/1989 | Takahashi et al. . |
| 4,851,771 | 7/1989 | Ikeda et al. . |
| 4,853,631 | 8/1989 | Carmen . |
| 4,853,632 | 8/1989 | Nagano et al. . |
| 4,857,841 | 8/1989 | Hastings et al. . |
| 4,866,382 | 9/1989 | Carmen . |
| 4,874,053 | 10/1989 | Kimura et al. . |
| 4,890,059 | 12/1989 | Guentner . |
| 4,914,387 | 4/1990 | Santos . |
| 4,914,389 | 4/1990 | Juds . |
| 4,922,197 | 5/1990 | Juds et al. . |
| 4,975,675 | 12/1990 | Becker . |
| 4,988,220 | 1/1991 | Christiansen et al. . |

(List continued on next page.)

*Primary Examiner*—Sandra L. O'Shea
*Assistant Examiner*—Roger Phillips
*Attorney, Agent, or Firm*—Nixon & Vanderhye

[57] ABSTRACT

A magneto-resistive tachometer includes an enclosure having a thickness of about ¾", formed with a central through opening therein and a plurality of bolt holes sized and located for alignment with bolt holes on a standard NEMA C-type motor end face. The enclosure has a recess formed adjacent the central through opening and adapted to receive a sensor electronics package, and a radial slot formed between the central through opening and the recess for receiving a sensing element. An associated sensor drum has a peripheral surface with encoded sensor patterns thereon adapted to be sensed by the sensing element, and a center hub connected to the peripheral surface by a plurality of spokes. The center hub is adapted for clamping engagement with the output shaft of the motor within the center opening of the enclosure, in radially adjacent position relative to the sensing element. At least one of the spokes is provided with shaft clamping means for securing the drum to the output shaft of the motor.

24 Claims, 6 Drawing Sheets

| | | | | | |
|---|---|---|---|---|---|
| 4,992,731 | 2/1991 | Lorenzen . | 5,081,416 | 1/1992 | La Croix . |
| 4,992,733 | 2/1991 | Griebeler . | 5,146,162 | 9/1992 | Kamiyama et al. . |
| 5,003,259 | 3/1991 | Palazzetti et al. . | 5,231,597 | 7/1993 | Komatsu . |
| 5,017,866 | 5/1991 | Santos et al. . | 5,293,125 | 3/1994 | Griffen et al. .......................... 324/173 |
| 5,019,776 | 5/1991 | Kawamata et al. . | 5,336,994 | 8/1994 | Griffen et al. .......................... 324/174 |
| 5,041,784 | 8/1991 | Griebeler . | | | |

SLIM PROFILE DIGITAL TACHOMETER INCLUDING PLANAR BLOCK AND ROTOR HAVING SPOKES AND CLAMP

This invention relates generally to digital tachometers, or encoders, utilizing magneto-resistive technology and specifically, to a slim profile digital tachometer design utilizing interchangeable sensing drum elements to thereby provide different resolution outputs.

BACKGROUND AND SUMMARY OF THE INVENTION

The low-resolution tachometers currently available for use on Industry Standard Frame Size AC and DC motors generally consist of a magnet biased sensor magnetically coupled to a metal gear-toothed wheel (the wheel being fastened to rotate with the DC motor output shaft). Relatively low pulse counts of 60, 120 and 240 pulses per revolution ("PPR") are typically obtained by providing an appropriate number of teeth on the gear-toothed wheel. Such gear wheel arrangements are useful in certain low-resolution applications, but have several disadvantages in other applications.

One major disadvantage of such standard tachometers is that different wheels must be provided for different pulse counts. This means that the manufacturer must make (and inventory) several different types of gear-like wheels having different numbers of teeth, i.e., 60, 120 or 240. This significantly increases design and manufacturing costs.

In addition, the resolution of prior art gear tooth (and optical) arrangements (whether of standard or slim profile design) is currently limited to about 240 PPR. For the gear-tooth type tachometer, this is because the upper limit on pulse count is a function of how many teeth can be placed accurately on the wheel and on the ability of the sensor to differentiate between the teeth. Mechanical durability and machining tolerances also limit the number of teeth that can be placed on the wheel. Moreover, speed variations, the size of the magnetic sensor, and other factors require a minimum spacing between teeth to ensure that each tooth is detected.

An improved magneto-resistive tachometer, which overcomes many of the disadvantages of known devices, is disclosed in commonly owned U.S. Pat. No. 5,293,125, the entirety of which is incorporated herein by reference.

Briefly, that patent application discloses a magneto-resistive sensor arrangement utilizing a non-magnetically biased magneto-resistive sensor element; a magnetized drum; and associated integrated circuit-based electronics. More specifically, the sensor arrangement includes an enclosure, a magneto-resistive probe, a drum secured to a hub, and an electronics module. The generally cylindrical enclosure is adapted for bolting onto, for example, the standard NEMA 4.5 inch (or 8.5 inch) C-face end plate (also known as a NEMA 56C face) of an AC or DC electric motor. In one exemplary embodiment, the hub is fastened to the end face of the motor shaft and a magneto-resistive drum is fastened to the hub. The drum includes two magnetized tracks: an incremental magnetic (INC) track and an index pulse (Z) track. Such magnetized tracks are formed in a conventional manner by magnetizing the periphery of the drum. The Z track encodes one pattern (pulse) per revolution, while the INC track encodes, in the preferred embodiment, 480 patterns (pulses) per revolution. The INC track may provide for up to 1024 patterns (pulses) per revolution.

In known slim profile tachometer designs, whether of the gear tooth or optical type, resolution, as already noted above, is currently limited to about 240 pulses per revolution. Slim profile designs are nevertheless desirable where components are located in series, along the output shaft of the motor. For example, a shaft brake may be mounted on the shaft, adjacent the tachometer and on the side thereof remote from the motor casing.

It is the object of this invention to utilize the magneto-resistive technology and interchangeability features of the tachometer disclosed in the '016 patent application, but in a slim profile tachometer design. In an exemplary embodiment, a slim profile enclosure or housing in the form of a thick rectangular plate or block is provided with a large circular aperture formed therein. The block or plate is otherwise substantially smooth on its exterior surfaces and is adapted to be secured by bolts or other suitable fasteners to a motor face having a standard NEMA rabbit, i.e., the NEMA 56C face. The enclosure central aperture is counterbored to provide a pair of radial steps or shoulders, such that three distinct diametrical surfaces are provided, the intermediate one of which is a critical diameter which exposes a sensor element to the magnetically encoded peripheral surface of an associated drum or adaptor fixed to the motor shaft. In other words, the encoded drum is slideably located on the motor shaft and moved into position within the enclosure such that the encoded, outer peripheral surface of the drum is radially adjacent the intermediate diameter of the enclosure, and spaced from the sensor element by a critical radial gap, as explained further herein.

In a typical upright position, a slot is formed in the enclosure at the 12 o'clock position, communicating the interior of the central aperture with an enlarged recess located above the central aperture and utilized to house the sensor electronics package. Within this slot, a sensor element is fixed at the above mentioned radial gap relative to the peripheral surface of the drum. It will be appreciated that the innermost diametrical surface within the central aperture and its associated radial shoulder, prevent the drum from sliding axially beyond the enclosure in a rearward direction toward the motor face. It will also be appreciated that the drum is easily removed from the front of the enclosure by sliding in an opposite or axially forward direction, i.e., away from the motor. It is also a feature of the invention to provide a removable cover for the front of the enclosure, to protect the drum, sensor element and associated electronics.

Another feature of the invention relates to the use of interchangeable drums, each provided with magnetic INC and Z tracks enabling different PPR outputs from 60 to 1024.

Another feature of the invention relates to the manner in which the drums are secured to the motor shaft. In the preferred embodiment, each drum includes a central hub connected to the peripheral portion thereof by three radial spokes. One of these spokes is slotted and incorporates a clamping screw so that upon tightening of the screw, the spoke compresses, thereby also causing the hub to be tightened about the motor shaft. In the preferred embodiment, the slotted spoke halves are also provided with oppositely facing axial openings for locating the clamping screw within the spoke. In this way, the drum can be cast, thereby eliminating the need for machining or drilling holes to accommodate the clamping screw.

It is another feature of the invention to provide a hardened washer on the clamping screw and within the slotted spoke to prevent overtightening of the clamping screw and thus preclude an out-of-round condition for the peripheral surface of the drum which, in turn, would negatively impact the performance of the tachometer.

In one aspect, therefore, the invention relates to a tachometer comprising:

a) a slim profile enclosure having a thickness of about ¾" and formed with a central through opening therein, and a plurality of bolt holes sized and located for alignment with bolt holes on a standard NEMA C-type motor end face; the enclosure having a recess formed adjacent the central opening and adapted to receive a sensor electronics package, and a radial slot between the central through opening and the recess for receiving a sensing element; and b) a first selected drum having a peripheral surface with encoded sensor patterns thereon adapted to be sensed by the sensing element, the drum having a center hub and a peripheral sensor surface connected to the center hub by a plurality of spokes, the center hub adapted for clamping engagement with the output shaft of the motor within the center opening of the enclosure and in radially adjacent position relative to the sensing element, at least one of the spokes provided with shaft clamping means for securing the drum to the output shaft of the motor.

In another aspect, the invention relates to a magneto-resistive tachometer comprising:

a) a thin profile enclosure formed with a central through opening therein, and a plurality of bolt holes sized and located for alignment with bolt holes on a standard NEMA C-type motor end face; the enclosure having a recess formed adjacent the central opening housing a sensor electronics package, and a radial slot between the central through opening and the recess for receiving a sensing element; and b) a plurality of interchangeable sensor drums for selective use with said enclosure, each drum having a peripheral surface with encoded sensing patterns thereon such that each drum provides a different number of pulses per revolution; each drum having a center hub connected to the peripheral surface and means for locking said hub to the output shaft of the motor.

In still another aspect, the invention relates to a tachometer enclosure comprising a block having a thickness of about ¾" and formed with a central through opening therein, and a plurality of bolt holes sized and located for alignment with bolt holes on a standard NEMA C-type motor end face; the enclosure having a recess formed adjacent the central through opening and adapted to receive a sensor electronics package and a radial slot between the central through opening and the recess for receiving a sensing element.

The slim profile, variable pulse tachometer of this invention provides many advantages to both the manufacturer and the customer. Some of the advantages accruing to the manufacturer follow.

1. A small number of parts are required for the construction of the tachometer.

2. Low tolerance (and hence low cost) machining for much of the enclosure is permitted by otherwise precise location of the sensing element.

3. The single style enclosure has many uses, and this allows the critical parts to be produced in high volume rather than a multitude of low volume parts.

4. Junction boxes and other coupling accessories can be attached if needed, thus increasing the versatility of the basic design.

5. Drum assemblies are interchangeable with the enclosures, so that components need not be matched. In practice, an in-house supply of enclosures and a variety of drums will be kept in stock for quick customer response.

6. The drum may be made from a plastic material which is resistant to damage. Other types of magnetic pulse wheels use a thin deposited magnetic layer on an aluminum drum, and this magnetic layer can be scratched if abused.

7. Pigtail cable, standard on all units, allows many coupling options with one standard cable.

Some of the advantages accruing to the customer are listed below.

1. This invention provides the highest pulse per revolution (PPR) output available (1024 PPR), using magneto-restrictive or Hall Effect technology, versus 120 or 240 PPR offered by others.

2. Desired pulse counts can easily be achieved simply by changing the drum size, the sensor and/or pulse division.

3. The tachometer of this invention is easy to assemble and install since it consists of just two mechanical parts, plus whatever is needed for electrical connection.

4. The device is self-aligning, so that no customer adjustment is required.

5. The tachometer of this invention is characterized by an absence of bearings or couplings. Being able to mount directly on the motor without bearings is a great advantage over many of the stand alone units available today which have bearings and require shaft coupling to the motor.

6. The tachometer enclosure is only ¾" thick, thus allowing applications where only limited space is available.

7. The customer can add a ring to the outer or forward side of the enclosure to make a double C-face configuration. This allows the unit to be attached to a motor face on one side, and to another accessory on the other side of the enclosure, e.g., gear boxes, brakes or other accessories.

8. Similar tachometers with different PPR drums can be stacked together on the motor shaft to provide multiple outputs.

9. The tachometer can be assembled into units with bearings to make stand alone units.

10. The tachometer can be fitted onto either the drive end or accessory end of a motor.

11. The pulse wheel or drum is also relatively thin to allow it to fit within the slim profile (¾") enclosure.

12. The interchangeable drums can be designed to fit over shafts up to 2.875" in diameter.

13. The enclosure may be made of aluminum which lowers cost, but is rugged enough to withstand mounting on motors and other accessories. A hard coat anodization may be applied to the aluminum enclosure.

14. Stainless steel versions will be provided for both the code wheel or drum and the enclosure where desired.

15. The electronics package is fully encapsulated for protection against humidity and harsh chemicals.

16. The quadrature angle is set within the sensor itself. Other known styles have two independent sensors that must be adjusted to gain quadrature.

17. The unit is essentially non-repairable, and the drum and/or enclosure are easily replaced if defective.

18. The drum assemblies are interchangeable with the enclosures. Thus, they do not have to be kept matched to each other.

Additional objects and advantages of the present invention will become apparent from the detailed description below.

DETAILED DESCRIPTION OF THE DRAWINGS

Figure 1:
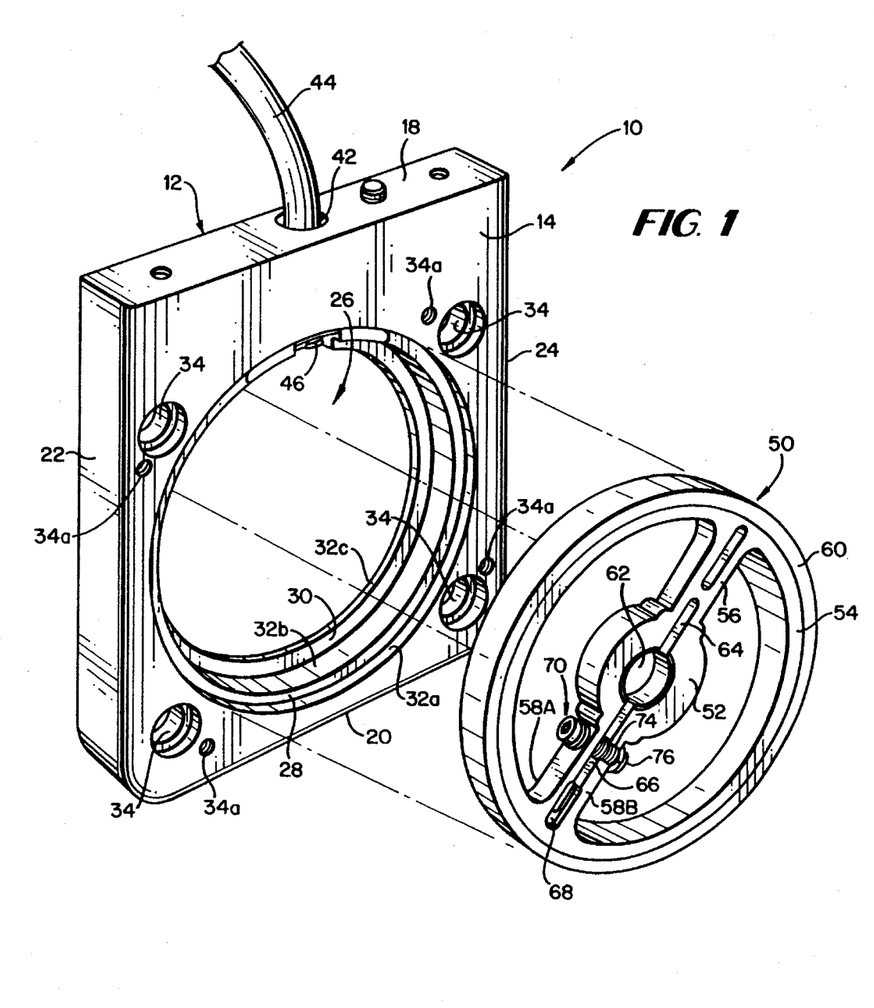
FIG. 1 is an exploded perspective view illustrating the enclosure and drum assembly in accordance with one exemplary embodiment of the invention.

With reference to FIG. 1, the tachometer 10 in accordance with an exemplary embodiment of this invention includes an enclosure 12 having front and back sides 14, 16, respectively, and peripheral end edges 18, 20, 22 and 24. The enclosure is formed with a central through opening 26, counterbored to provide radial shoulders 28 and 30, and axially extending diametrical surfaces 32a, 32b and 32c. In the exemplary embodiment, the enclosure 12 is formed from a substantially planar aluminum block, approximately ¾ inch thick.

Four counterbored bolt holes 34 are provided in the enclosure 12 to allow bolt heads to seat therein, the holes sized and arranged to permit the enclosure 12 to be mounted to, e.g., a standard NEMA 56C motor face or end plate.

The enclosure 12 is also provided with fastener holes 34a, one adjacent each bolt hole 34. Holes 34a are used to secure a tachometer cover, as will be described in greater detail below in connection with the preferred embodiment.

Figure 2:
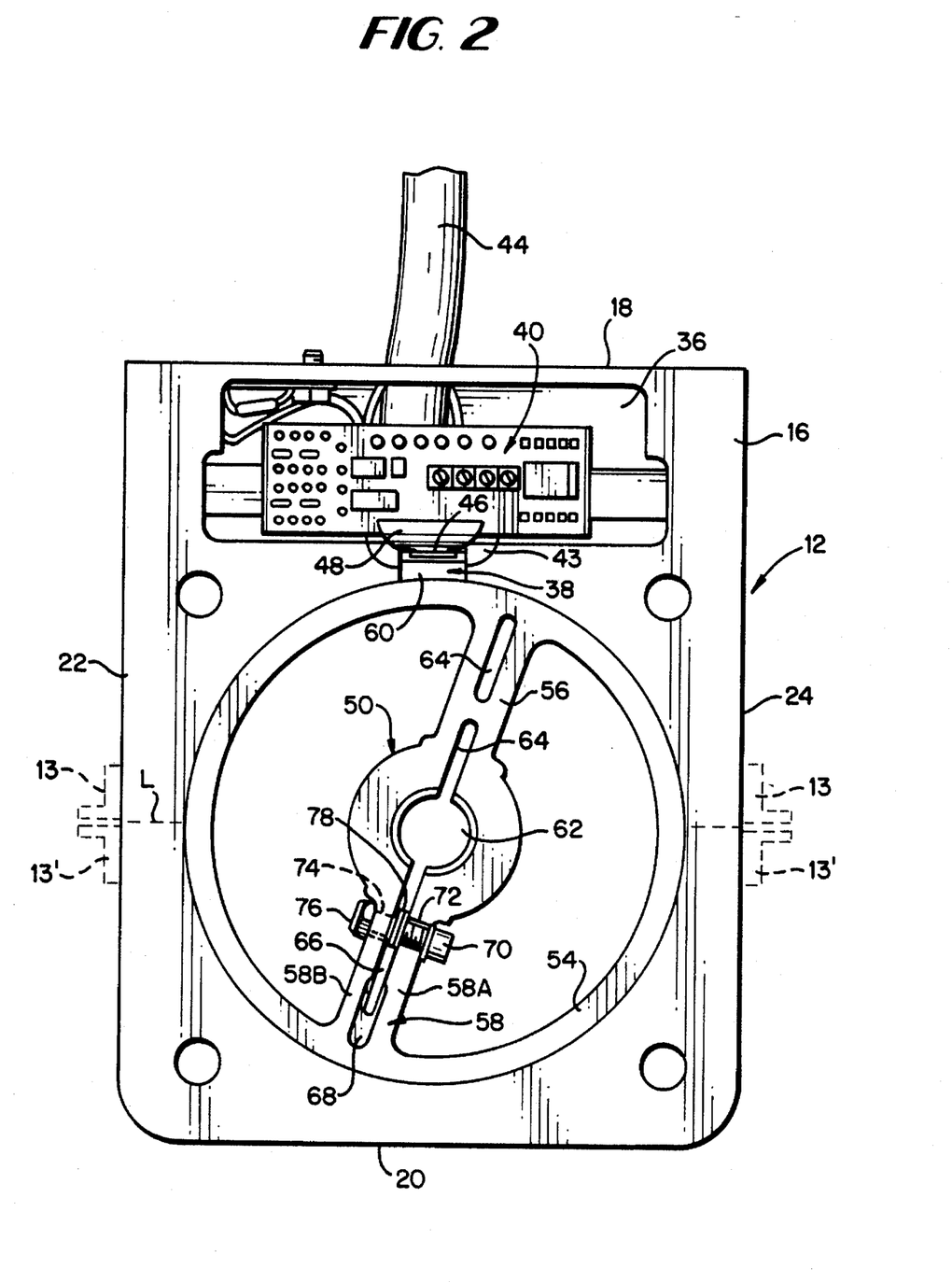
FIG. 2 is a rear elevation of the tachometer and drum illustrated in FIG. 1, but with the drum located within the enclosure.

With reference now also to FIG. 2, the back side of the enclosure 12 is formed with a recess 36, of a generally elongated rectangular shape, adjacent the center opening 26. A second recess or slot 38 bridges the recess 36 and opening 26 as explained further below.

A magneto-resistive sensor electronics package 40 is enclosed within the recess 36, and a hole 42 through the top peripheral surface 18 enables a cable 44 to pass out of the block without interfering with the tachometer mounting arrangements. A magneto-resistive sensor element assembly 46 (including the sensor element per se and an associated carrier plate or substrate) is located in the second recess or slot 38, and, preferably, is fixed in the recess 38 by embedding the element in a suitable resin material. The sensor assembly 46 is connected to the sensor electronics package 40 by a conventional connector ribbon 48.

Prior to locating the sensor assembly 46 within the recess 38, the sensor element per se is first mounted on the carrier or substrate utilizing a thin layer of, for example, LOCTITE 365 UV epoxy. A UV light source is then used to cure the epoxy.

Figure 3:
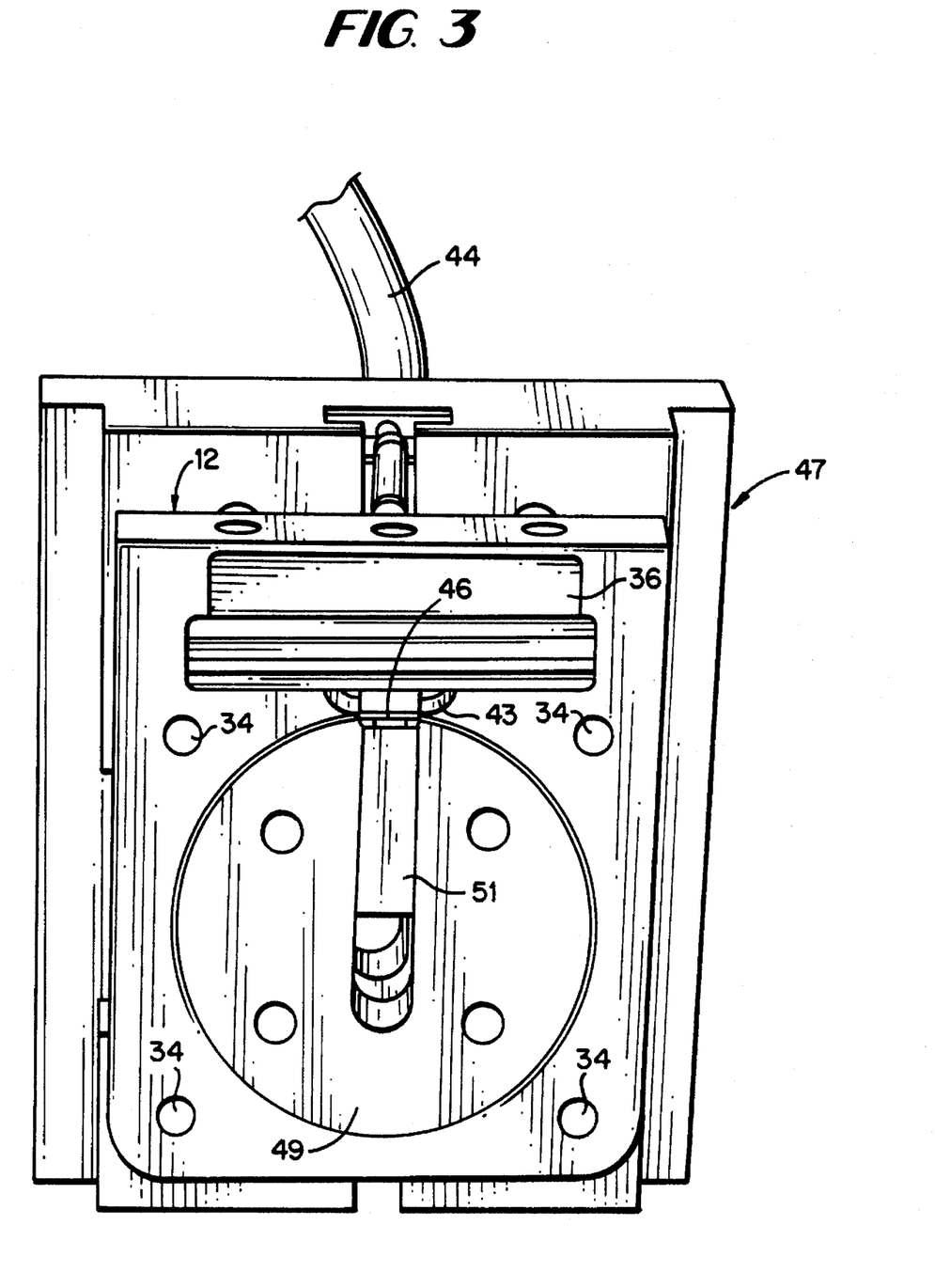
FIG. 3, 3A and 3B are a rear elevation of the tachometer installed on an assembly fixture.
Figure 3A:
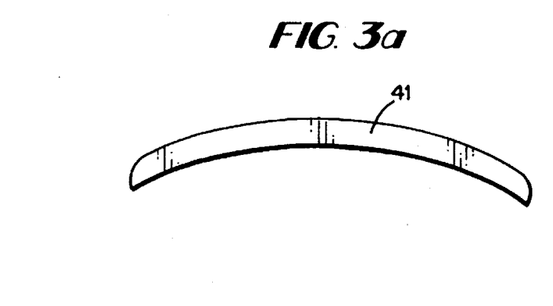
Figure 3B:
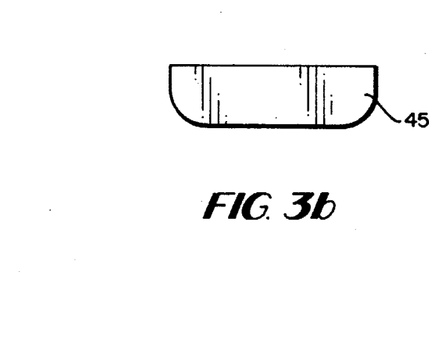

It should be noted here that the sensor element assembly 46 is protected on opposite sides of the enclosure by front and back shims. On the front of the enclosure 12, radial shoulder 28 is formed with a notch 39 which is adapted to receive a correspondingly shaped front shim (removed from FIGS. 1 and 3 for clarity, but shown in FIG. 3A at 41). Similarly, the back face of the enclosure 12 is formed with a notch 43 for receiving a correspondingly shaped shim (removed from FIG. 2 for clarity, but shown in FIG. 3B at 45).

In mounting the sensor assembly 46 within the recess or slot 38, the front shim or guard 41 is first secured in the notch 39 as described below. The enclosure 12 is then installed on a suitable fixture 47 (see FIG. 3) which includes a cylindrical projection 49 adapted to fit within the central through opening 26, in engagement with diametrical surface 32C. The fixture also includes a radial slide element 51 carrying the sensor assembly 46 so that the sensor assembly can be properly radially and angularly located within the recess 38. Installation of the sensor is done with care and precision to achieve a desirable radial gap of, for example 0.020", with a tolerance of less than ±0.002". Once properly located at the desired radial gap setting, and also aligned so as to be parallel to the tangent of an associated drum and with the magnetic poles on the drum parallel to the grid lines on the sensor element, a UV epoxy is applied to fill the gap and radiated to cure the epoxy. After the epoxy is at least partially cured, i.e., sufficiently to hold the sensor assembly 40 in place so that the enclosure 12 can be removed from the fixture 47, final curing is carried out. Additional epoxy may then be applied to fill in the rest of the radial gap and the recess or slot 38, and then cured to assure a strong bond.

The sensor electronics package 40 including the printed circuit board (PCB), is located within the larger recess 36 and also held in place initially by the use of a quick drying epoxy. Recess 36 may first be lined with copper shielding to reduce sensitivity to electrical noise. The flexible cable 44 extending from the sensor assembly 46 is then soldered in place. A protective tape may be placed over the exposed sensor assembly 40 until ready for use. Following calibration, the back shim guard 45 is applied to the enclosure 12 to protect the back of the sensor assembly 40 and the ribbon connector 48. It should be noted that the wall portion of the enclosure 12 separating recess 36 from slot 38 is itself slightly recessed from the rear face of the enclosure to allow the ribbon connector 48 to extend between the electronics package 40 in recess 36 to the sensor assembly 46 in slot 38, even when shim guard 45 is in place. The shim 45 also creates a small pocket or well at the end of the carrier/sensor assembly 46 that is subsequently filled with BI-WAX. This is a soft epoxy that seals the area. A Teflon pad is clamped across the PCB recess 36 not only enclosing the PCB area, but also allowing the introduction of an encapsulant. In a final step, CONAP epoxy is used to encapsulate the PCB within the recess 36. The previously applied BI-WAX will act as a seal to keep the CONAP from leaking out of the PCB recess.

As already noted, the enclosure 12 is preferably constructed of a lightweight metal such as aluminum, which is relatively easily machined to precise tolerances, but other material, such as stainless steel, may also be used.

Referring again to FIG. 2, it may be seen that the enclosure 12 may be split into upper and lower halves, along a separation line shown in phantom and designated by letter L. Associated and mating L-bracket pairs 13, 13' can be fixed to the enclosure halves and utilized for securing the halves together by means of bolts or other suitable fasteners. This arrangement provides easy removal and replacement of the tachometer particularly when it is used on long motor output shafts with accessories adjacent that side of the tachometer (i.e., the forward or front side) which is remote from the motor.

The other significant component of the tachometer 10 in accordance with this invention relates to the use of interchangeable, encoded sensor drums, one of which is shown at 50. The drum may be also formed of aluminum or of a suitable plastic material, and includes a center hub 52 and a peripheral rim 54 connected by a pair of radial spokes 56, 58. The rim 54 mounts a peripheral sensing ring 60 to which is applied magnetic sensing patterns (INC and Z tracks) as described in detail in commonly owned U.S. Pat. No. 5,293,125.

The center hub 52 defines a motor shaft opening 62. An integral shaft clamping mechanism is built in to the radial spokes 56, 58 as described below. A first elongated radial slot 64 extends from shaft opening 62 into the spoke 56. An elongated, radially aligned (and radially spaced) recess 66 extends along the spoke 56 to the rim 54. A similar recess appears on the opposite side of the spoke 56. These recesses by themselves reduce weight within the spoke to achieve a weight similar to the spoke 58 as described below.

A second elongated slot 66 (which may also be regarded as a continuation of slot 64) is formed in the opposed spoke 58, extending from the shaft opening 62 radially outwardly substantially to the peripheral rim 54. At the end of slot 66, there is a reduced thickness area 68 which, again, provides desired weight reduction, and, in addition, prevents overflexing at the juncture with the rim 60, thus insuring against an out-of-round condition (of the rim 54) upon tightening of the clamp as further described below.

A clamping screw 70 is used to compress the split halves 58A and 58B of the spoke 58, and to this end, oppositely facing slots are formed on the split halves, one shown at 72 on split half 58A, and another shown at 74 formed in split half 58B facing in the opposite direction. This arrangement permits the screw 70 to be located as shown, in such a manner that it will not fall free of the spoke 58. The advantage to this construction is that it allows the spoke configuration to be cast without expensive machining of bores for the clamping screw 70.

The threaded clamping screw 70 cooperates with nut 76 to compress the split halves 58A and 58B, thus causing hub 62 to radially compress about the motor shaft, locking the drum 50 to the shaft. It is a further feature of this invention to prevent overtightening of the screw 70 by inserting a hard metal washer 78 on the screw 70, (FIG. 2) between the spoke halves 58A and 58B. Thus, when the screw 70 is tightened to the extent of hard engagement between the washer 78 and split halves 58A and 58B, no further compression of the spoke halves is permitted, and thus, no out-of-round condition of the drum as a whole (and particularly the peripheral surface 60) can result.

Figure 4:
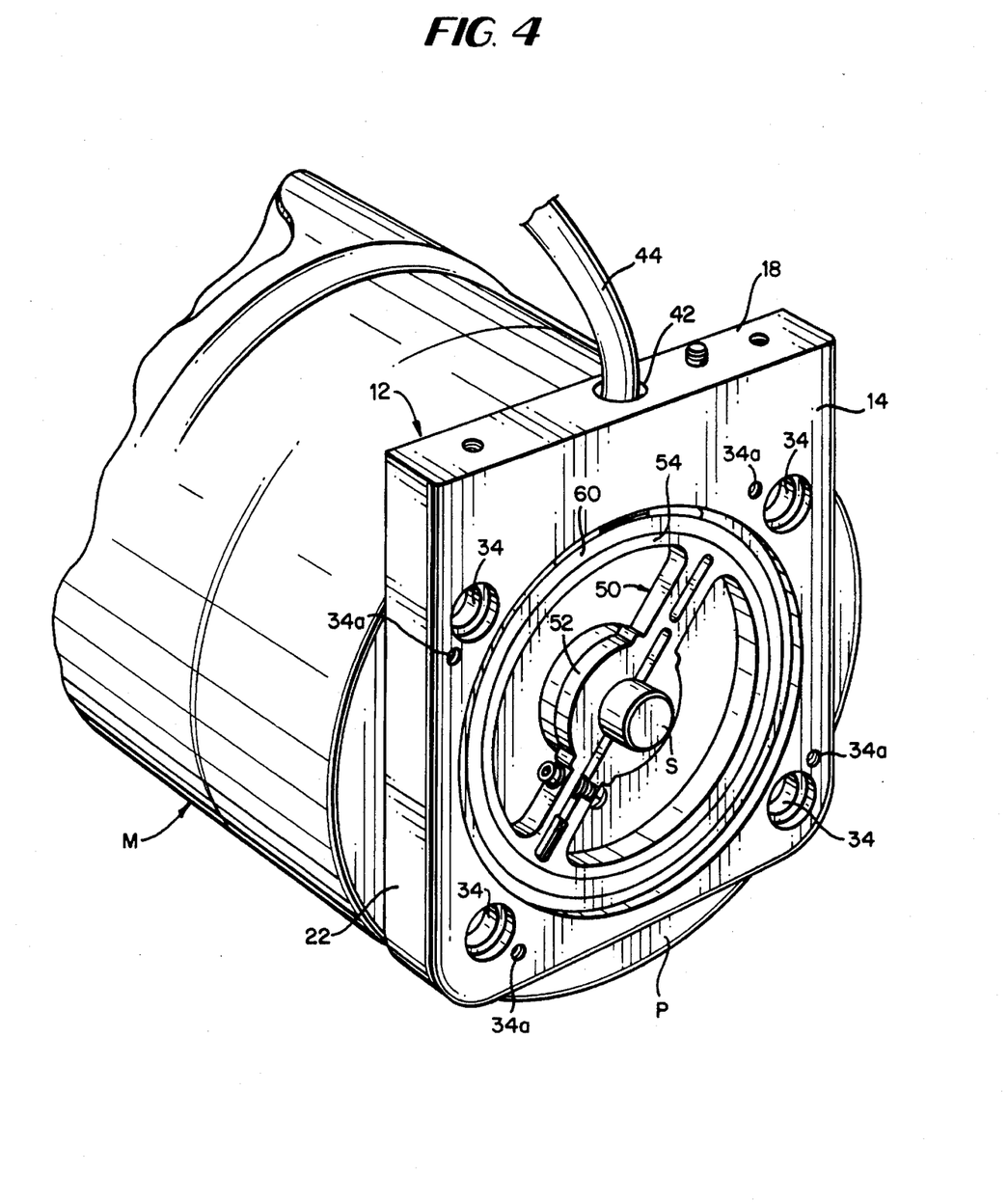
FIG. 4 is a partial perspective of the enclosure and drum as shown in FIGS. 1 and 2, but shown in position for securement to the end face of a motor in an operative position.

To install the above described tachometer, the enclosure 12 is first bolted onto the motor end plate or face P of the motor M (see FIG. 4). A drum 50 (sized to provide the desired PPR output) is then slidably mounted over the motor output shaft S and the edge of the drum 50 is lined up with the radial shoulder 28 of the drum, with the peripheral surface of ring 60 radially adjacent the diametrical surface 32b. The clamping screw 70 on the spoke of the drum 50 is then tightened to fix the drum to the shaft. The electrical inputs are then hooked up as required.

Figure 5:
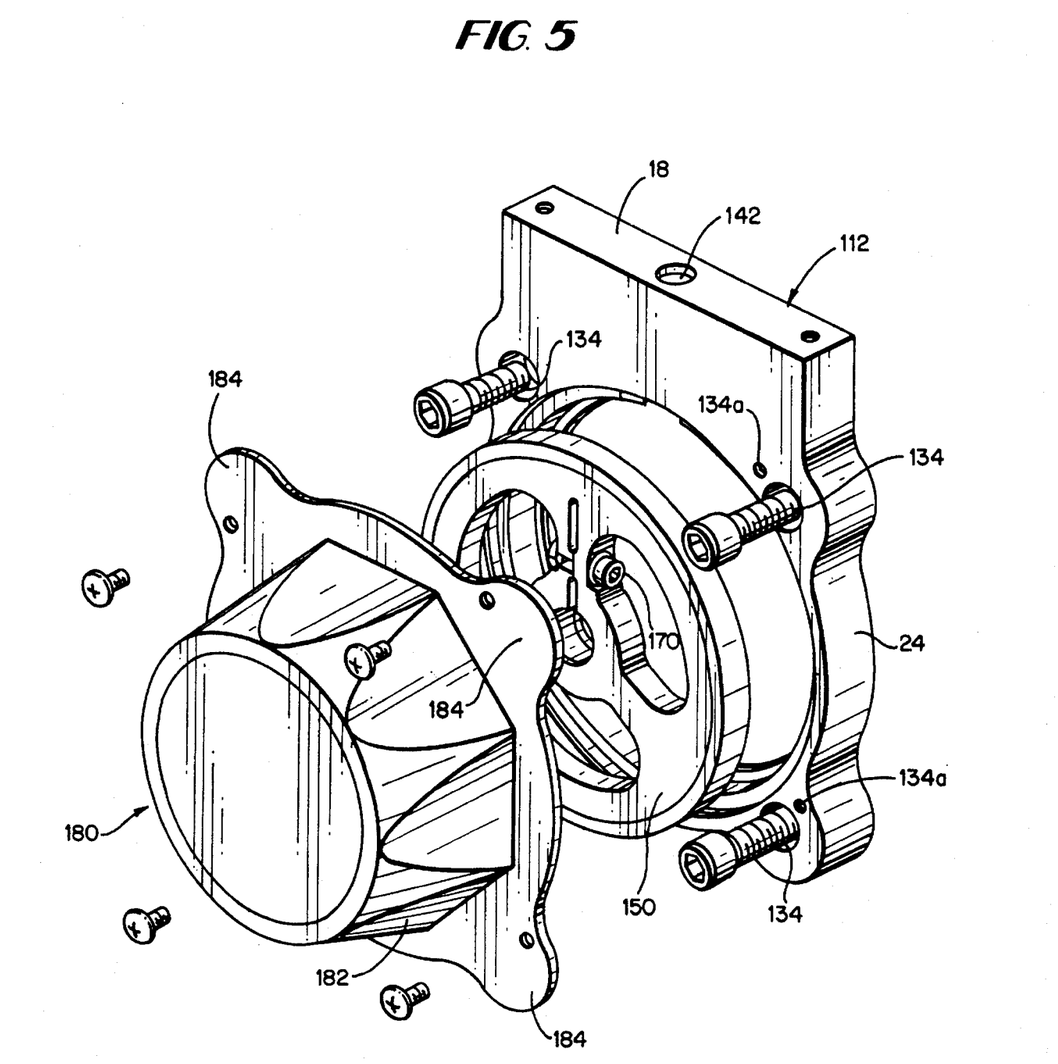
FIG. 5 is a partially exploded perspective of an alternative and preferred embodiment of the tachometer in accordance with this invention.
Figure 6:
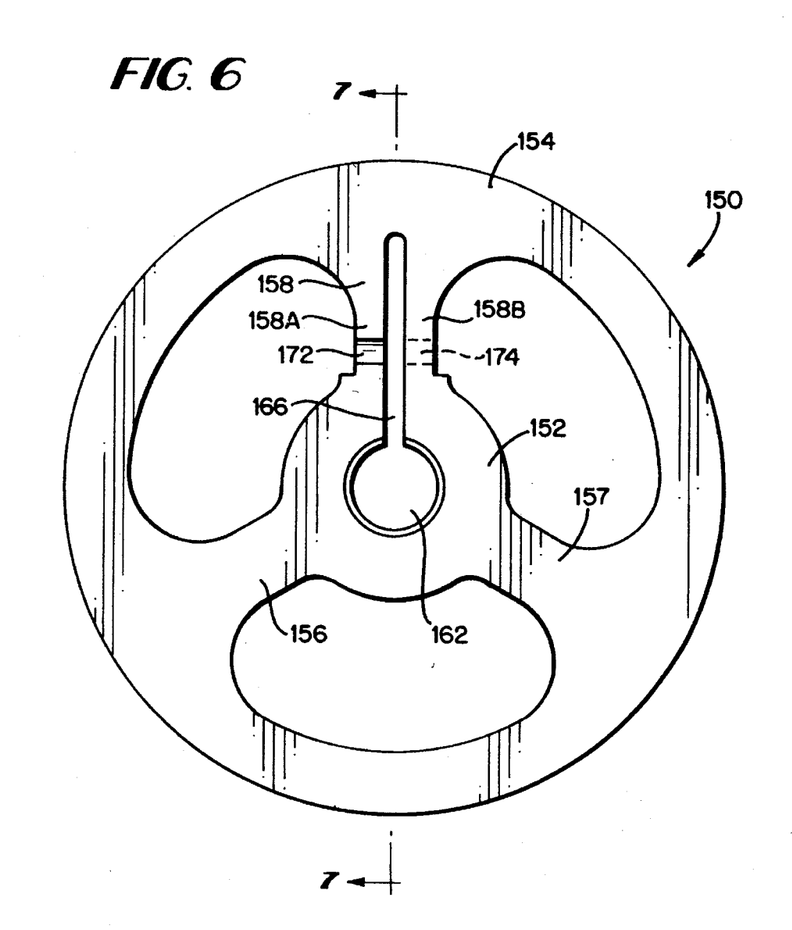
FIG. 6 is a front elevation of an alternative sensing drum used in the FIG. 5 embodiment.
Figure 7:
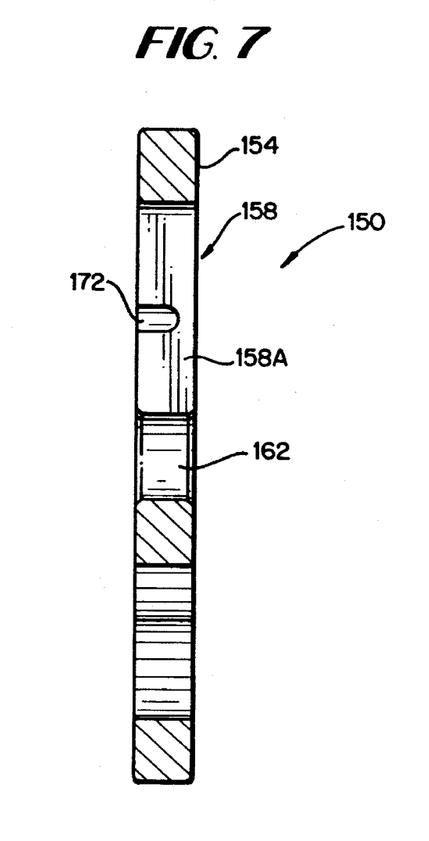
FIG. 7 is a cross section taken through the line 7—7 of FIG. 6.

Turning now to FIGS. 5–7, a preferred embodiment of the invention is illustrated which functions in a substantially identical manner to the first described embodiment. In fact, with the exception of a few differences noted below, both the structure and manner of operation is the same, and similar reference numerals are used to denote common elements, but with the prefix "1" added.

The encoded drum 150 in this preferred embodiment is formed with three spokes 156, 157 and 158, equally spaced about the hub 152. Only one elongated slot 166 is required here, extending from shaft opening 162 to the rim 154. Oppositely facing slots 172, 174 are formed in the split halves 158A, 158B for receiving a clamping screw 170. A washer (not visible in FIG. 4) is inserted between the split halves 158A, 158B, over the screw 170 (FIG. 5) to prevent overtightening in the same manner as described above.

With reference especially to FIG. 5, a cover 180 having a substantially cylindrical portion 182 and four mounting ears 184 is adapted for securement over the front face of the enclosure 12, using the fastening holes 34A in the enclosure 112. This serves to keep dirt and/or other debris away from the drum 150 as it rotates within the fixed enclosure 112.

It will be appreciated that the tachometer of this invention, and specifically the electronics package, including the sensing element assembly, and the drums (including INC and Z patterns), are similar structurally and functionally to those described in the '016 application, and therefore need not be described in further detail here.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A magneto-resistive tachometer comprising:
  a) an enclosure formed as a substantially planar block having front and back sides and a peripheral edge defining a substantially uniform thickness of the block of about ¾", and formed with a central through opening therein, and a plurality of bolt holes sized and located for alignment with bolt holes on a standard NEMA C-type monitor end face; said block having a recess formed therein adjacent said central through opening and adapted to receive a sensor electronics package, and a radial slot in the block between said central through opening and said recess for receiving a sensing element; and
  b) a first selected drum having a peripheral surface with encoded sensor patterns thereon adapted to be sensed by said sensing element, said drum having a center hub connected to said peripheral surface by a plurality of spokes, said center hub adapted for clamping engagement with an output shaft of the motor within said center opening of said enclosure and in radially adjacent position relative to said sensing element, at least one of said spokes provided with an integral clamp for securing said drum to the output shaft of the motor.

2. The tachometer of claim 1 and including a plurality of additional drums, interchangeable with said first selected drum, and adapted to provide different numbers of pulses per revolution.

3. The tachometer of claim 1 wherein said enclosure is formed with a second recess bridging said first recess and said center opening, said sensor element located in said second recess.

4. The tachometer of claim 1 wherein said enclosure is provided with a hole in a top or side edge surface thereof for passing a cable out of said recess.

5. The tachometer of claim 1 wherein said sensing element is a magneto-resistive element and said sensing patterns comprise magnetic patterns.

6. The tachometer of claim 1 wherein said plurality of spokes comprises at least two spokes.

7. The tachometer of claim 2 wherein said different number of pulses per revolution range from 100 to 1024.

8. A magneto-resistive tachometer comprising:
   a) an enclosure formed as a substantially planar block having front and back sides and a peripheral edge defining a substantially uniform thickness of the block of about ¾", and formed with a central through opening therein, and a plurality of bolt holes sized and located for alignment with bolt holes on a standard NEMA C-type monitor end face; said block having a recess formed therein adjacent said central through opening and adapted to receive a sensor electronics package, and a radial slot in the block between said central through opening and said recess for receiving a sensing element; and
   b) a first selected drum having a peripheral surface with encoded sensor patterns thereon adapted to be sensed by said sensing element, said drum having a center hub connected to said peripheral surface by a plurality of spokes, said center hub adapted for clamping engagement with an output shaft of the motor within said center Opening of said enclosure and in radially adjacent position relative to said sensing element, at least one of said spokes provided with an integral clamp for securing said drum to the output shaft of the motor, said integral clamp comprising a slot in at least one of said spokes, and a clamping screw passing transversely through said slot.

9. The tachometer of claim 8 and including means for preventing overtightening of said screw.

10. The tachometer of claim 9 wherein said preventing means comprises a washer fitted on said screw and located within said slot.

11. A tachometer comprising:
   a) a one piece enclosure formed as a substantially planar block having front and back sides and a peripheral edge defining a substantially uniform thickness of the block, and formed with a central through opening therein, and a plurality of bolt holes sized and located for alignment with bolt holes on a standard NEMA C-type motor end face; said block having a recess formed adjacent said central through opening and adapted to receive a sensor electronics package, and a radial slot in said block between said central through opening and said recess for receiving a sensing element; and
   b) a plurality of interchangeable sensor drums for selective use with said enclosure, each having a peripheral surface with encoded sensor patterns thereon adapted to be sensed by said sensing element such that each drum provides a different number of pulses per revolution; each drum having a center hub connected to said peripheral surface by a plurality of radial spokes and means on at least one of said spokes for locking said hub to an output shaft of a motor.

12. The tachometer of claim 11 and including a cover adapted to fit over a front face of the enclosure.

13. The tachometer of claim 11 wherein said enclosure is formed with a second recess bridging said first recess and said center opening, said sensor element located in said second recess.

14. The tachometer of claim 11 wherein said enclosure is provided with a hole in a top or side edge surface thereof for passing a cable out of said recess.

15. The tachometer of claim 11 wherein said sensing element is a magneto-resistive element and said sensing patterns comprise magnetic patterns.

16. The tachometer of claim 11 wherein said different number of pulses per revolution range from 100 to 1024.

17. A tachometer comprising:
   a) an enclosure formed as a substantially planar block having front and back sides and a peripheral edge defining a substantially uniform thickness of the block, and formed with a central through opening therein, and a plurality of bolt holes sized and located for alignment with bolt holes on a standard NEMA C-type motor end face; said block having a recess formed therein adjacent said central through opening and adapted to receive a sensor electronics package, and a radial slot between said central through opening and said recess for receiving a sensing element; and
   b) a plurality of interchangeable sensor drums for selective use with said enclosure, each having a center hub and peripheral surface with encoded sensor patterns thereon adapted to be sensed by said sensing element such that each drum provides a different number of pulses per revolution; wherein said center hub is connected to said peripheral surface by at least two radial spokes, and wherein locking means are provided on at least one of said spokes for locking said hub to an output shaft of a motor, said locking means comprising a slot in at least one of said spokes, and a clamping screw passing transversely through said slot.

18. The tachometer of claim 17 and including means for preventing overtightening of said screw.

19. The tachometer of claim 18 wherein said preventing means comprises a washer fitted on said screw and located within said slot.

20. A tachometer comprising:
   a) an enclosure formed as a substantially planar block having front and back sides and a peripheral edge defining a substantially uniform thickness of the block, and formed with a central through opening therein, and a plurality of bolt holes sized and located for alignment with bolt holes on a standard NEMA C-type motor end face; said block having a recess formed therein adjacent said central through opening and adapted to receive a sensor electronics package, and a radial slot between said central through opening and said recess for receiving a sensing element; and
   b) a plurality of interchangeable sensor drums for selective use with said enclosure, each having a center hub and peripheral surface with encoded sensor patterns thereon adapted to be sensed by said sensing element such that each drum provides a different number of pulses per revolution; wherein said center hub is connected to said peripheral surface by at least three radial spokes, and wherein locking means are provided on at least one of said spokes for locking said hub to an output shaft of a motor, said locking means comprising a slot in at least one of said spokes, and a clamping screw passing transversely through said slot.

21. A tachometer enclosure comprising a substantially planar block having front and back sides and a peripheral edge defining a thickness of the block of about ¾" and formed with a central through opening therein; and a plurality of bolt holes sized and located for alignment with bolt holes on a standard NEMA C-type motor end face; said block having a recess formed therein adjacent said central through opening and adapted to receive a sensor electronics package, and a radial slot in the block formed between said central through opening and said recess for receiving a sensing element.

22. The tachometer enclosure of claim 21 and including a cable opening in an edge surface of the block and communicating with said recess.

23. The tachometer enclosure of claim 21 including a cover adapted to fit over a front face of the enclosure.

24. The tachometer of claim 21 wherein said block is split into upper and lower halves and includes means for securing said upper and lower halves together.

* * * * *